(12) United States Patent
Griffin et al.

(10) Patent No.: US 12,299,135 B2
(45) Date of Patent: May 13, 2025

(54) K-ANONYMOUS VULNERABILITY DETECTION

(71) Applicant: Red Hat, Inc., Raleigh, NC (US)

(72) Inventors: Leigh Griffin, Waterford (IE); Paolo Antinori, Milan (IT)

(73) Assignee: Red Hat, Inc., Raleigh, NC (US)

(*) Notice: Subject to any disclaimer, the term of this patent is extended or adjusted under 35 U.S.C. 154(b) by 179 days.

(21) Appl. No.: 17/956,234

(22) Filed: Sep. 29, 2022

(65) Prior Publication Data

US 2024/0111876 A1    Apr. 4, 2024

(51) Int. Cl.
*G06F 21/57*    (2013.01)

(52) U.S. Cl.
CPC ...... *G06F 21/577* (2013.01); *G06F 2221/033* (2013.01)

(58) Field of Classification Search
CPC .............. G06F 21/577; G06F 2221/033
See application file for complete search history.

(56) References Cited

U.S. PATENT DOCUMENTS

| | | | |
|---|---|---|---|
| 9,355,258 B2 | 5/2016 | Ukil et al. | |
| 10,628,608 B2 | 4/2020 | Hebert et al. | |
| 10,860,722 B2* | 12/2020 | Usuba | G06F 21/577 |
| 11,048,820 B2 | 6/2021 | Ahmed | |
| 2007/0101433 A1* | 5/2007 | Louch | G06F 21/577 726/25 |
| 2009/0282476 A1* | 11/2009 | Nachenberg | G06F 21/577 726/22 |
| 2017/0034023 A1* | 2/2017 | Nickolov | H04L 43/0817 |
| 2017/0318048 A1* | 11/2017 | Htay | H04L 63/1433 |
| 2018/0026995 A1* | 1/2018 | Dufour | H04W 12/128 726/23 |
| 2019/0075129 A1* | 3/2019 | Czarny | G06F 16/21 |
| 2020/0074084 A1* | 3/2020 | Dorrans | G06F 21/577 |
| 2020/0082095 A1* | 3/2020 | Mcallister | G06F 11/323 |
| 2020/0097662 A1* | 3/2020 | Hufsmith | H04L 9/0643 |
| 2020/0159933 A1* | 5/2020 | Ciano | G06F 21/577 |
| 2021/0034602 A1 | 2/2021 | Levacher et al. | |
| 2021/0133327 A1* | 5/2021 | Wu | G06F 21/577 |
| 2021/0382997 A1* | 12/2021 | Yi | G06F 21/577 |
| 2022/0253527 A1* | 8/2022 | Tripathi | G06N 3/084 |
| 2022/0374528 A1* | 11/2022 | Isoyama | G06F 21/577 |
| 2023/0004653 A1* | 1/2023 | Shiraishi | G06F 21/577 |

(Continued)

OTHER PUBLICATIONS

NPL Search History (Year: 2024).*

(Continued)

*Primary Examiner* — Samson B Lemma
*Assistant Examiner* — Richard W Cruz-Franqui
(74) *Attorney, Agent, or Firm* — Dority & Manning, P.A.

(57) ABSTRACT

K-anonymous vulnerability detection is disclosed. Data descriptive of a container image including at least one container layer having a layer identifier is received. The layer identifier is encoded to produce an encoded layer identifier. A first portion of the layer identifier is transmitted to a vulnerability registry server. One or more vulnerability identifiers are received from the vulnerability server. The vulnerability identifiers are associated with the first portion of the encoded layer identifier. It is determined that the layer identifier matches a matching vulnerability identifier of the one or more vulnerability identifiers.

20 Claims, 5 Drawing Sheets

(56) References Cited

U.S. PATENT DOCUMENTS

| | | | |
|---|---|---|---|
| 2023/0071309 A1* | 3/2023 | Giura | H04L 63/1433 |
| 2023/0319094 A1* | 10/2023 | Bakman | H04L 63/1425 |
| | | | 726/25 |
| 2024/0111876 A1* | 4/2024 | Griffin | G06F 21/577 |
| 2024/0126878 A1* | 4/2024 | Tripathi | G06F 21/577 |

OTHER PUBLICATIONS

Bhattacharya, Munmun, et al., "Preserving Privacy in Social Network Graph with K-anonymize Degree Sequence Generation," 2015 9th International Conference on Software, Knowledge, Information Management and Applications (SKIMA), doi: 10.1109/SKIMA.2015.7400035, 2015, 7 pages.

Gupta, Amit Kumar, et al., "Privacy Preservation in Big Data using K-Anonymity Algorithm with Privacy Key," International Journal of Computer Applications (0975-8887), vol. 153—No. 5, Nov. 2016, 6 pages.

Kesarwani, Manish, et al., "Secure k-Anonymization over Encrypted Databases," arXiv:2108.04780v1 [cs.CR], 10.1109/CLOUD53861.2021.00015, Aug. 10, 2021, 31 pages.

Paquette, Serge-Olivier, "Knowledge extraction on anonymized data—K-anonymity," https://delvesecurity.com/fr/knowledge-extraction-on-anonymized-data-k-anonymity/, Sep. 6, 2019, 9 pages.

* cited by examiner

K-ANONYMOUS VULNERABILITY DETECTION

BACKGROUND

Known vulnerabilities in software modules can be recorded in a vulnerability registry server, such as a Common Vulnerabilities and Exposures (CVE) database. The server can provide for entities to query the server about particular software based on a unique identifier. The server will return data describing whether the software having that unique identifiers has any recorded vulnerabilities.

SUMMARY

The present disclosure provides a mechanism for k-anonymous vulnerability detection through obfuscated k-anonymous communications with a vulnerability registry server. A computer system hosting a container image can query a vulnerability registry server with an encoded identifier that is based on a first portion of a layer identifier of a container layer of the container image. The encoded identifier can be truncated and/or hashed such that the value of the original layer identifier cannot be recreated from only the encoded identifier. The vulnerability registry server returns a set of vulnerability identifiers that match the encoded identifier. Because the encoded identifier is based on only a portion of the layer identifier, the vulnerability registry server will often return several results, only one of which matches the original layer identifier. In this way, the communications are k-anonymous. A third party intercepting communications between the computer system and the vulnerability registry server thus cannot reliably determine which, if any, vulnerabilities are present at the computer system, even with knowledge of the entire communication.

In one example a method is provided. The method includes receiving, by a computer system comprising one or more computing devices, data descriptive of a container image, the container image comprising at least one container layer, the at least one container layer having a layer identifier. The method further includes encoding, by the computer system, the layer identifier to produce an encoded identifier. The method further includes transmitting, by the computer system, a first portion of the encoded identifier to a vulnerability registry server. The method further includes receiving, by the computer system, one or more vulnerability identifiers from the vulnerability registry server, each of the one or more vulnerability identifiers associated with the first portion of the encoded identifier. The method further includes determining, by the computer system, that the layer identifier matches a matching vulnerability identifier of the one or more vulnerability identifiers.

In another example a computer system is provided. The computer system includes one or more computing devices to receive data descriptive of a container image, the container image comprising at least one container layer, the at least one layer having a container layer identifier. The computing devices further encode the layer identifier to produce an encoded identifier. The computing devices further transmit a first portion of the encoded identifier to a vulnerability registry server. The computing devices further receive one or more vulnerability identifiers from the vulnerability registry server, each of the one or more vulnerability identifiers associated with the first portion of the encoded identifier. The computing devices further determine that the layer identifier matches a matching vulnerability identifier of the one or more vulnerability identifiers.

In another example a non-transitory computer-readable storage medium is provided. The storage medium includes executable instructions to cause one or more processor devices to receive data descriptive of a container image, the container image comprising at least one container layer, the at least one layer having a container layer identifier. The instructions further cause the one or more processor devices to encode the layer identifier to produce an encoded identifier. The instructions further cause the one or more processor devices to transmit a first portion of the encoded identifier to a vulnerability registry server. The instructions further cause the one or more processor devices to receive one or more vulnerability identifiers from the vulnerability registry server, each of the one or more vulnerability identifiers associated with the first portion of the encoded identifier. The instructions further cause the one or more processor devices to determine that the layer identifier matches a matching vulnerability identifier of the one or more vulnerability identifiers.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
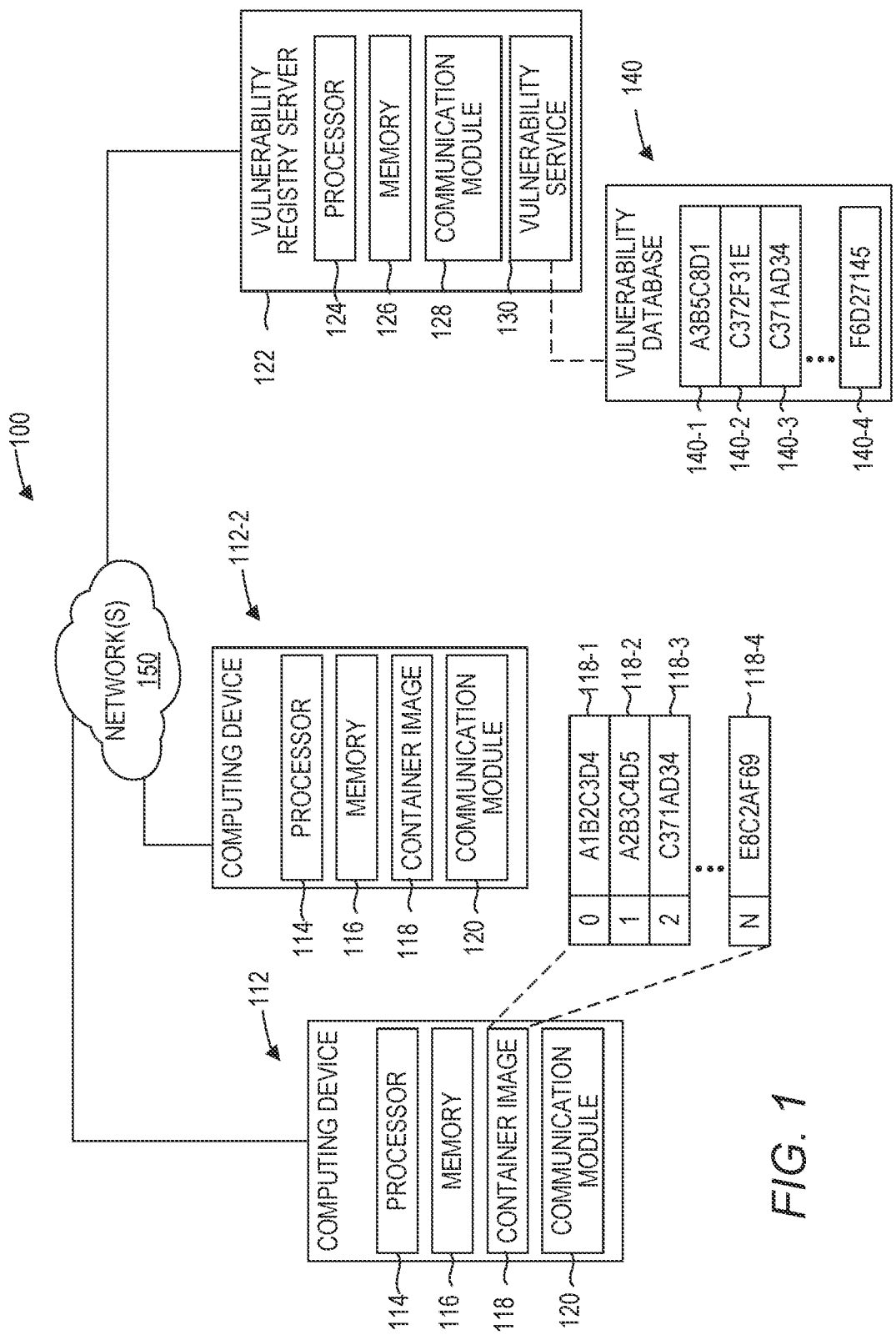
FIG. 1 is a block diagram of an environment for vulnerability detection according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or"

as used herein and in the claims is inclusive unless contextually impossible. As an example, the recitation of A or B means A, or B, or both A and B. The word "data" may be used herein in the singular or plural depending on the context.

It is desirable for software users or managers to assess vulnerabilities or exposures in their software platforms. To facilitate this, some entities maintain a vulnerability registry server that hosts data descriptive of known vulnerabilities, exposures, attacks, and/or other security threats. For example, the vulnerability registry server can maintain a list or dataset of vulnerability identifiers that are descriptive of software packages, programs, applications, etc. with known vulnerabilities, such as a Common Vulnerabilities & Exposures (CVE) database. A user can then look up a software package in the dataset with reference to the software package's identifier to determine if the software package has any vulnerabilities.

The use of a vulnerability registry server can be beneficial when distributing container images among a distributed computing environment, such as a cloud computing environment. For instance, a computer system can check whether a container image includes any layers with known vulnerabilities before installing or executing the container image by communicating identifiers of the layers of the container image to the vulnerability registry server. However, directly communicating the layer identifiers to the vulnerability registry server can itself present security risks. For example, if the vulnerability registry server is untrusted or compromised or if a malicious actor reads or intercepts communications between the vulnerability registry server and computer system that include the layer identifier, the malicious actor can deduce that the entity associated with the computer system utilizes container images including that layer. The malicious actor can thus learn suspected vulnerabilities of software at the computer system.

Another challenge associated with the use of a vulnerability registry server relates to maintaining confidentiality of vulnerabilities on the server. For instance, vulnerability identifiers on the vulnerability registry server (e.g., in a CVE database) can be subjected to an embargoed phase, where the existence of the vulnerability identifier is desirably only revealed to trusted parties. It can be challenging to exchange information between a vulnerability registry server and computer system such that a malicious actor will not learn of the existence of the vulnerability even if the actor has intercepted some private communications.

The present disclosure solves these problems by obfuscating communications between the computer system and vulnerability registry server. To accomplish this, the computer system sends only a portion of a layer identifier corresponding to a layer in a container image. The layer identifier can additionally be hashed or otherwise transformed to further obfuscate the communication. In response, the vulnerability registry system returns a collection of vulnerability identifiers matching the portion of the layer identifier that it received from the computer system. The computer system can search the collection of vulnerability identifiers to see if the targeted layer identifier is present in the collection without exposing the targeted layer identifier itself to network communications.

The present disclosure can provide for assessing vulnerabilities in container images. Containers and containerizing orchestration tooling (e.g., Docker, Kubernetes, OpenShift, etc.) provide for powerful and convenient deployment and recreation of computing environments across one or more computing devices. A container can include software directed to some functionality along with necessary components (e.g., software packages, operating system modifications, etc.) necessary to implement that functionality. For instance, a container builder can build a container image in a given computing environment. The container image provides for a modular and relatively isolated computing environment for the given functionality, which can be especially beneficial in deployments across multiple computing devices, such as in a cloud computing environment. In particular, the container image is a stand-alone executable package that includes all the resources needed to run, such as executable(s), system tools, system libraries, settings, and the like. The container image can include one or more layers corresponding to hierarchical software collections and/or dependencies.

Example aspects of the present disclosure provide a number of improvements to computing technology. For instance, example aspects of the present disclosure improve anonymity of computer systems when communicating sensitive information, such as known vulnerabilities on a system. The improved anonymity can provide for improved security and reduced occurrences of unauthorized access to the computer environment. Additionally, systems and methods described herein can provide for improved distribution of secure container images across distributed computing environments, which can reduce computing resource expenditures on verifying secure operation by each computing device.

FIG. 1 is a block diagram of an environment 100 for vulnerability detection according to one example. The environment 100 includes a computing device 112 hosting a container image 118 for which vulnerabilities will be assessed by communicating with a vulnerability registry server 122 according to the examples disclosed herein. The environment 100 is depicted as including a first computing device 112 and a second computing device 112-2. It should be understood that any suitable number of computing devices 112 can be included in environment 100 without deviating from the present disclosure. For instance, in some implementations, the computing device(s) 112, 112-2 can be at least a portion of a cloud computing environment, such as a computer system including one or more computing devices. The computing device 112, 112-2 can include a processor 114 and/or a memory 116. The computing device 112, 112-2 can additionally include a communication module 120 to facilitate communications (e.g., over network(s) 150) with other systems, such as other computing device(s) 112, the vulnerability registry server 122, etc.

The computing device 112 can host a container image 118. The container image 118 may be or include any containerization technology or containerization technologies, such as, by way of non-limiting example, Open Shift, Docker, Kubernetes, or the like. In some applicable cases, the phrase "container" as used herein can refer to Linux containers wherein the Linux kernel features cgroups and namespaces are used to isolate processes from one another but may also be used to refer to any suitable container. In some implementations, for example, a container can be grouped with a plurality of other containers in a pod, such as a Kubernetes pod. The phrase "container image" as used herein refers to a static package of software comprising one or more layers, the layers including everything needed to run an application (i.e., as a container) that corresponds to the container image, including, for example, one or more of executable runtime code, system tools, system libraries and configuration settings. A Docker® image is an example of a container image.

The container image 118 can include one or more container layers. The container layers can define a hierarchical structure of software functionality. Each container layer can be associated with a layer identifier. For instance, the container image 118 includes a first (or $0^{th}$) layer 118-1, such as a base layer (e.g., an operating system layer). Additionally, the container image 118 can include a second layer 118-2, a third layer 118-3, and any number of further layers through Nth layer 118-4.

As illustrated in FIG. 1, the layer 118-1 includes a layer identifier "A1B2C3D4." Similarly, the layer 118-2 is identified by the layer identifier "A2B3C4D5," the layer 118-3 is identified by the layer identifier "C371AD34," and the layer 118-4 is identified by the layer identifier "E8C2AF69." The layer identifiers can uniquely identify each layer of the container image 118. For instance, the layer identifiers may be assigned by a programmer, by a container repository, by a hosting service, or by another suitable entity. It should be understood that the example layer identifiers in FIG. 1 are merely illustrative. For instance, although the layer identifiers are illustrated as eight-character hexadecimal strings for the purposes of illustration, the layer identifiers can be any suitable form of identifier, including but not limited to binary strings, alphanumeric strings, (e.g., Unicode strings), hexadecimal strings, indices, or any other suitable form of identifier. Additionally and/or alternatively, the layer identifiers can have any suitable length, such as eight characters, sixteen characters, etc.

The environment 100 can also include the vulnerability registry server 122. The vulnerability registry server 122 can include a processor 124 and/or a memory 126. The vulnerability registry server 122 can additionally include a communication module 128 to facilitate communications (e.g., over network(s) 150) with other systems, such as computing device(s) 112.

The vulnerability registry server 122 can offer a vulnerability service 130 that provides for computing devices (e.g., computing device 112) to query a vulnerability database 140 based on software identifiers. Because the vulnerability service 130 is a component of the vulnerability registry server 122, functionality implemented by the vulnerability service 130 may be attributed to the vulnerability registry server 122 generally. Moreover, in examples where the vulnerability service 130 comprises software instructions that program the processor device 124 to carry out functionality discussed herein, functionality implemented by the vulnerability service 130 may be attributed herein to the processor device 124.

The vulnerability database can store one or more vulnerability identifiers corresponding to known vulnerabilities in software modules (e.g., layers, applications, etc.) based on their unique identifiers. For example, a first vulnerability identifier 140-1 corresponds to a software module having the identifier "A3B5C8D1." Similarly, vulnerability identifier 140-2 corresponds to a software module having the identifier "C372F31E," vulnerability identifier 140-3 corresponds to a software module having the identifier "C371AD34," and vulnerability identifier 140-4 corresponds to a software module having the identifier "F6D27145." In some implementations, in addition to the vulnerability identifiers themselves, the vulnerability database 140 can store information relating to the nature of the vulnerabilities and/or versioning associated with the vulnerabilities.

It should be appreciated that the information stored in vulnerability database 140 may be highly sensitive information. It can be desirable to keep information regarding vulnerabilities in the vulnerability database 140 secret from malicious parties. For instance, if an attacker learns the identity of a software module with a vulnerability, the attacker may be motivated to try and exploit that software module. Similarly, if an attacker learns or deduces that a given computer system is using a particular piece of software, and further knows how to exploit the vulnerability, the attacker will have an easier time gaining unauthorized access to the computer system or interfering with the computer system. Thus, for example, computing device 112 can desirably communicate with the vulnerability service 130 to search the vulnerability database 140 without exposing what identifiers the computing device 112 is searching for.

Although only a single vulnerability registry server 122 is depicted in FIG. 1 for the purposes of illustration, functionality attributable to vulnerability registry server 122 may be distributed among a plurality of computing devices, in some implementations. Furthermore, although vulnerability database 140 is depicted as separate from the vulnerability registry server 122, the vulnerability database 140 may also be implemented at the vulnerability registry server 122, in some implementations.

In some examples, the container environment 100 is implemented in a cloud computer system, such as, by way of non-limiting example, an Amazon Web Services (AWS) or Microsoft Azure cloud computing environment. The phrase "cloud computer system" or "cloud computing environment" refers to a system that provides automated on-demand self-service to multiple external entities (e.g., external computing devices) via an application programming interface (API) over a network to a shared pool of configurable computing devices used to implement requests from the external entities for computing resources, such as data storage, application execution, and database management computing resources. The examples have applicability in, among other environments, any type of cloud computing environment, such as, by way of non-limiting example, public, private, and/or hybrid cloud computing environments implemented, for example, by Red Hat® OpenStack, Oracle® Cloud, Amazon® Web Services, Google® Cloud, Microsoft® Azure, IBM® cloud services, Salesforce.com®, and the like. For instance, the examples can be useful in distributing identical container images across several computing devices comprising a cloud computing environment with reduced manpower and/or computing resource requirements.

According to example aspects of the present disclosure, the computing device 112 can transmit an encoded identifier to the vulnerability registry server 122. The encoded identifier can be encoded such the complete layer identifier cannot be produced from the encoded identifier alone. For instance, the encoded identifier can be a first portion of a layer identifier. The encoded identifier may additionally be hashed or otherwise transformed to obfuscate which characters are present in the layer identifier, in some cases. For instance, in one example implementation, the encoded identifier can be a first portion of a layer identifier that is hashed by a hashing algorithm, such as an SHA-1 hashing algorithm. The vulnerability registry server 122 (e.g., the vulnerability service 130) can restore the first portion of the layer identifier from the encoded identifier (e.g., by de-hashing) and compare the first portion of the layer identifier to the vulnerability identifiers in the vulnerability database 140.

Figure 2:
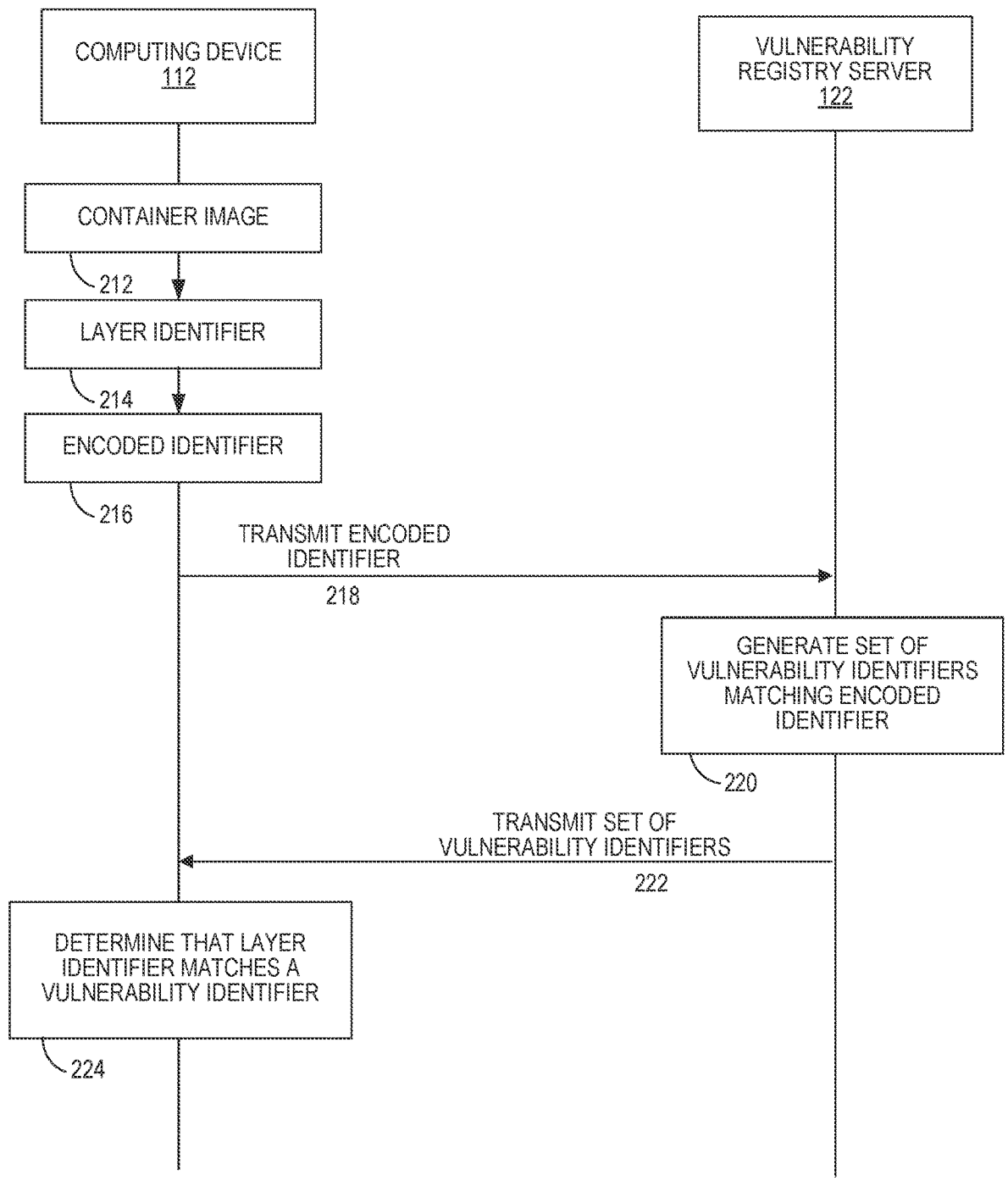
FIG. 2 is a data flow diagram of vulnerability detection according to one example.

This process is explained further with respect to FIG. 2. The computing device 112 having a container image 212 can encode a layer identifier 214 of that container image 212 to produce an encoded identifier 216. At 218, the computing device 112 transmits the encoded identifier to the vulnerability registry server. For the example container image 118 of FIG. 1, as an example, the computing device 112 can encode and transmit each layer identifier. Consider, for example, that the computing device transmits the first three characters of the layer identifier of layer 118-3, "C37," as the encoded identifier 216. At 220, the vulnerability registry server 122 generates a set of vulnerability identifiers matching the encoded identifier 216. Again using the example encoded identifier "C37" and the vulnerability database 140 of FIG. 1, note that both identifiers 140-2 and 140-3 begin with "C37." The set of vulnerability identifiers will thus include both identifiers 140-2 and 140-3. The vulnerability registry server 122 then, at 222, encodes and/or transmits the set of vulnerability identifiers back to the computing device 112. The computing device 112 then, at 224, determines whether the layer identifier 214 matches any of the vulnerability identifiers in the set. For instance, using the example described above, the computing device 112 will determine that the vulnerability identifier 140-2 matches the layer identifier of layer 118-3, and that layer 118-3 therefore has a known vulnerability.

Figure 3:
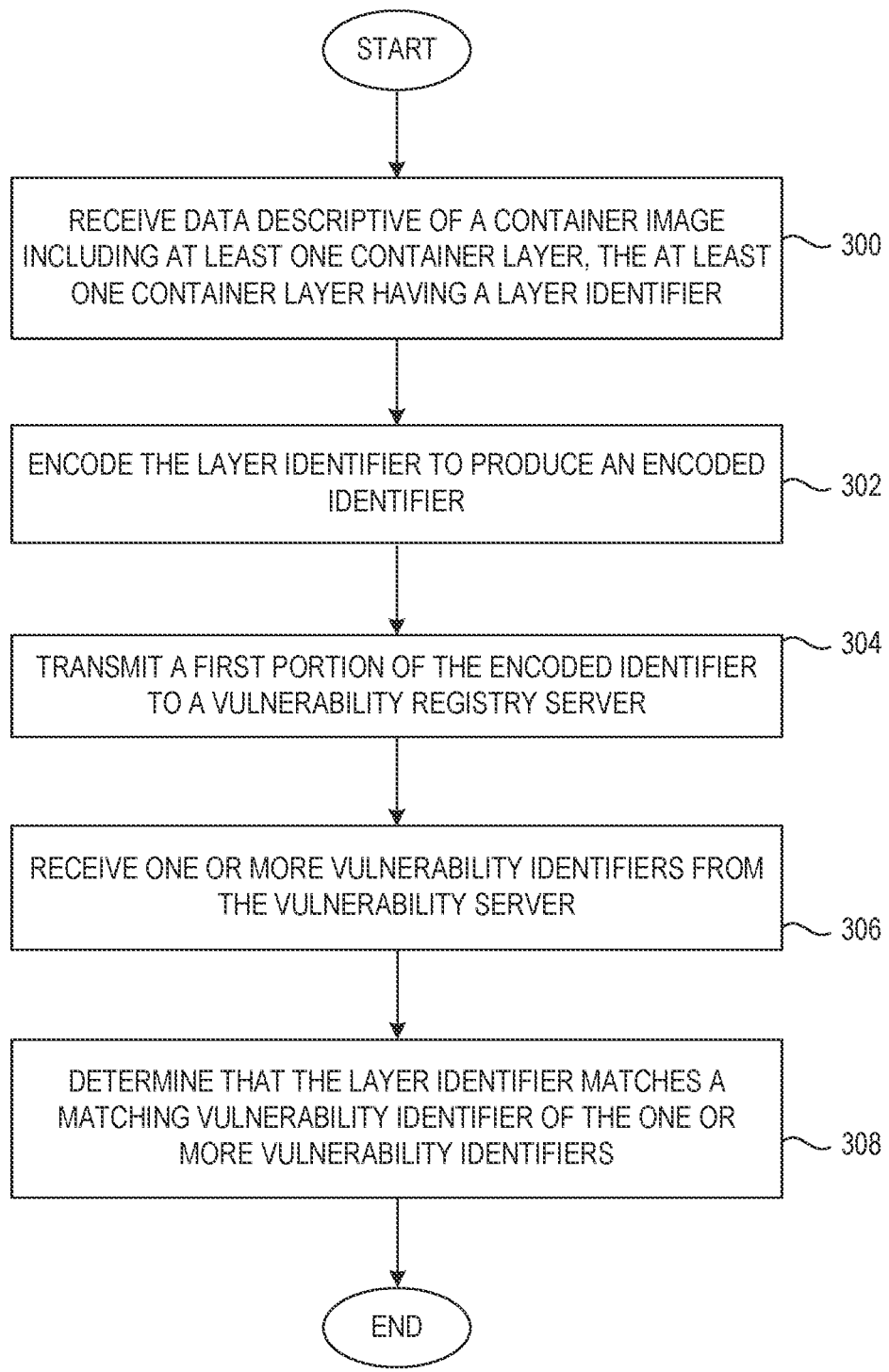
FIG. 3 is a flowchart of a method for vulnerability detection according to one example.

FIG. 3 is a flowchart of a method for vulnerability detection according to one example. The method of FIG. 3 can be implemented by any suitable computer system, such as the computing environment 100 of FIG. 1.

At 300, the method can include receiving (e.g., by a computer system including one or more computing devices) data descriptive of a container image. The container image can include at least one container layer. The container layer(s) can be descriptive of a functional grouping of software functionality (e.g., software packages) in the container image. For instance, each layer may identify a package or set of packages that implement some desired functionality as part of the larger container image. The at least one container layer can have a layer identifier. The layer identifiers can be any suitable form of identifier, including but not limited to binary strings, alphanumeric strings, (e.g., Unicode strings), hexadecimal strings, indices, or any other suitable form of identifier. Additionally and/or alternatively, the layer identifiers can have any suitable length, such as eight characters, sixteen characters, etc.

At 302, the method can include encoding (e.g., by the computer system) the layer identifier to produce an encoded identifier. For instance, the computer system can encode the layer identifier by a combination of truncation, hashing, and/or other transforms such that the layer identifier cannot reliably be recreated even if an adversarial party had complete knowledge of the encoded identifier (e.g., such as by intercepting a communication including the encoded identifier.

In some implementations, encoding the layer identifier can include truncating the layer identifier to produce the encoded identifier. The encoded identifier can be a truncated portion of the layer identifier. For instance, in some implementations, the encoded identifier can be only a first portion of the original layer identifier. As an example, if the layer identifier is a sixteen-character hexadecimal value, the encoded identifier can be a truncated first portion of the layer identifier, such as a first N characters of the layer identifier (e.g., "ABCDE" of "ABCDEFABCDEFABCD").

Additionally and/or alternatively, in some implementations, encoding the layer identifier can include hashing the layer identifier with a hashing algorithm configured to receive the layer identifier as input and produce as output the encoded identifier. The encoded identifier can be a hashed identifier. For instance, a layer identifier can be hashed with a hashing algorithm such that an entity reading the encoded identifier cannot discern the layer identifier. If the computer system and the vulnerability registry server share knowledge of which hash is used, the vulnerability registry server and/or computer system can decode communications from the other. The hashing algorithm can be any suitable hashing algorithm, such as an MD5 algorithm, SHA-1 algorithm, SHA-2 algorithm, NTLM algorithm, and/or CRC32 algorithm. In implementations where both truncation and hashing are used, the operations can be performed in any order. As examples, the hashing can be performed on only a first portion of the layer identifier and/or the complete layer identifier can be hashed, and a first portion of the hashed identifier can be used as the encoded identifier.

At 304, the method can include transmitting (e.g., by the computer system) a first portion of the encoded identifier to a vulnerability registry server. In some implementations, the first portion of the encoded identifier can be a first set of consecutive characters of the encoded identifier and/or the second portion of the encoded identifier comprises a remainder of the encoded identifier. For instance, the computer system may transmit only a first portion of the encoded identifier so that the entire layer identifier cannot be reliably recreated from the encoded identifier even if an attacker were to break any encryption or hashing on the encoded identifier. In some implementations, the vulnerability registry server can be or can include a Common Vulnerabilities & Exposures (CVE) database.

At 306, the method can include receiving (e.g., by the computer system) one or more vulnerability identifiers from the vulnerability registry server. Each of the one or more vulnerability identifiers can be associated with the first portion of the encoded identifier. The vulnerability server can decode the first portion of the encoded identifier to recreate only a portion of the layer identifier at the vulnerability registry server. For example, if the encoded identifier is a hashed identifier, the vulnerability registry server can undo the hash to reproduce the original characters used to generate the hash. The vulnerability registry server can match the decoded identifier to the corresponding portion of the vulnerability identifiers. As an example, if the transmitted portion of the layer identifier is the first N characters, the vulnerability registry server will select all vulnerability identifiers with the same first N characters. The vulnerability registry server will then transmit the selected vulnerability identifiers back to the computer system. In some implementations, the vulnerability registry system can encode (e.g., in the same encoding manner as the encoded identifier) the selected vulnerability identifiers before transmitting the identifiers to the computer system.

At 308, the method can include determining (e.g., by the computer system) that the layer identifier matches a matching vulnerability identifier of the one or more vulnerability identifiers. For instance, upon receiving a collection of vulnerability identifiers, the computer system can compare the layer identifier to each of the vulnerability identifiers to detect whether a match is present. It should be understood that the computer system may compare the entire layer identifier to the entire vulnerability identifier and/or compare only the second portions of the layer identifier and vulnerability identifier, since it may be presumed that the first portions of the vulnerability identifiers returned by the vulnerability registry server match the first portion of the layer identifier sent to the server.

Additionally and/or alternatively, the method can include determining (e.g., by the computer system) that the encoded identifier does not match any of the one or more vulnerability identifiers. For instance, if the container layer does not have any known vulnerabilities, it should not be present at the vulnerability registry server or in the results returned by the server. In some implementations, in response to determining that the encoded identifier does not match any of the one or more vulnerability identifiers, the computer system a communication to one or more remote computing devices indicating that the container image does not match any of the one or more vulnerability identifiers. For instance, the computer system may notify other computing devices in a common computing environment (e.g., a cloud computing environment) that the container image does not contain vulnerabilities and/or is safe to use.

In some implementations, the method further includes, in response to determining that the second portion of the layer identifier matches the corresponding second portion of the matching vulnerability identifier, handling a vulnerability in the container image. Handling a vulnerability in the container image can include steps necessary to register or react to the presence of a vulnerability in a container image. As one example, handling a vulnerability in the container image can include notifying at least one other computer system in a computing environment (e.g., another cloud server) of the vulnerability. For example, if a computing device in a cloud computing environment detects a vulnerability in one of its containers, it can notify other computing devices in the cloud computing environment of the vulnerability. As another example, the computing device may suspend operation of containers based on the container image, may uninstall the container image, may flag the container image for updating, or any of other various steps for handling the vulnerability.

In some implementations, receiving the data descriptive of the container image can include receiving, by the computer system, a command to download the container image. The method can further include, in response to determining that the second portion of the layer identifier matches the corresponding second portion of the matching vulnerability identifier, aborting a download process of the container image. For instance, the method can be performed as part of the download process to ensure that the container image does not include any vulnerable layers, prior to downloading. If a container layer is vulnerable, the download can be aborted automatically and/or by an operator of the computer system. In this way, the security of the computer system can be increased as downloads of unsafe container images are prohibited.

Figure 4:
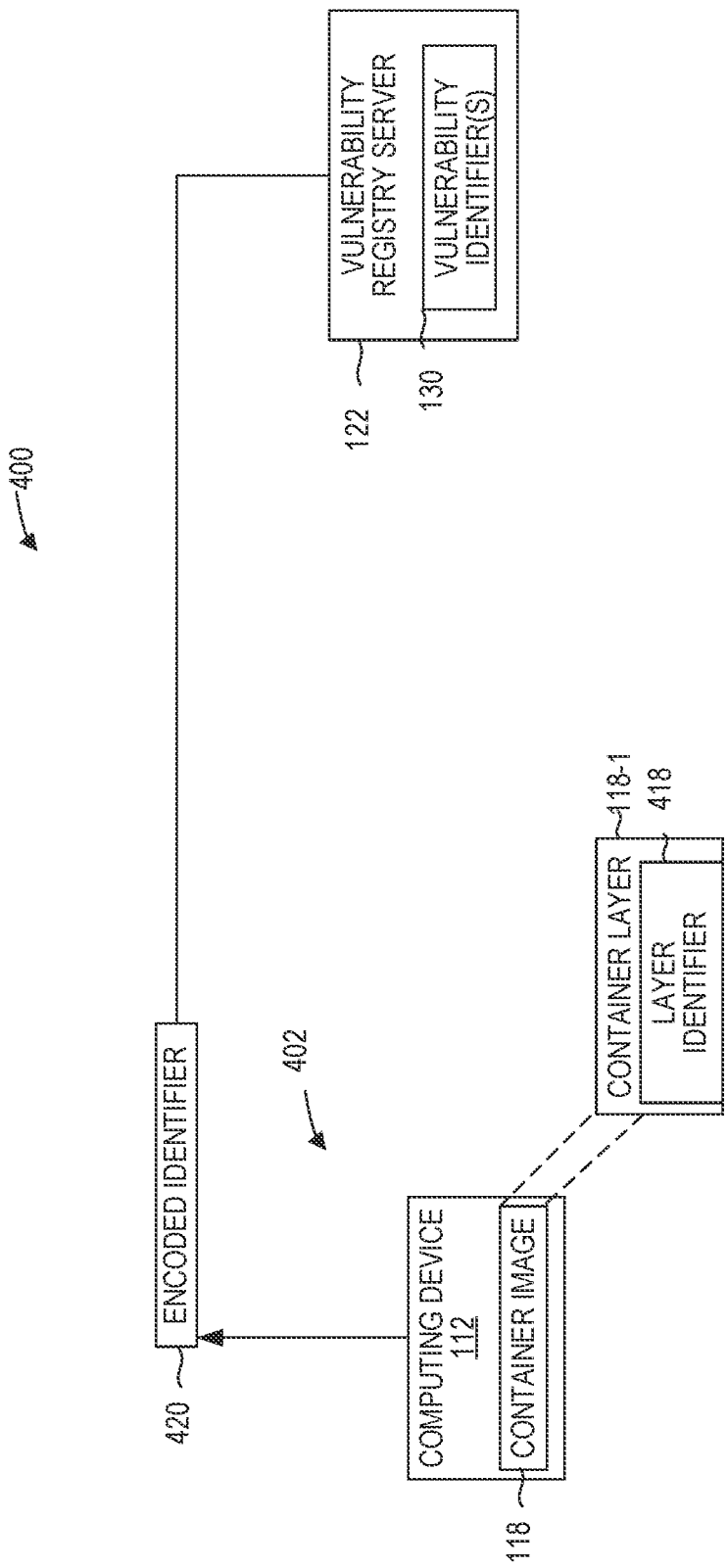
FIG. 4 is a block diagram of an environment for vulnerability detection according to one example.

FIG. 4 is a simplified block diagram of a computing environment 400 for vulnerability detection according to one example, The environment 400 includes a computer system 402 one or more computing devices 112 to receive data descriptive of a container image 118. The container image includes at least one container layer 118-1. The at least one container layer has a layer identifier 418. The computing device(s) 112 further encodes the layer identifier 418 to produce an encoded identifier 420. The computing device(s) 112 further transmit a first portion of the encoded identifier 420 to a vulnerability registry server 122. The computing device(s) 112 further receive one or more vulnerability identifiers 130 from the vulnerability registry server 122. Each of the one or more vulnerability identifiers 130 are associated with the first portion of the encoded identifier 420. The computing device(s) 112 further determine that the encoded identifier 420 matches a matching vulnerability identifier of the one or more vulnerability identifiers 130.

Figure 5:
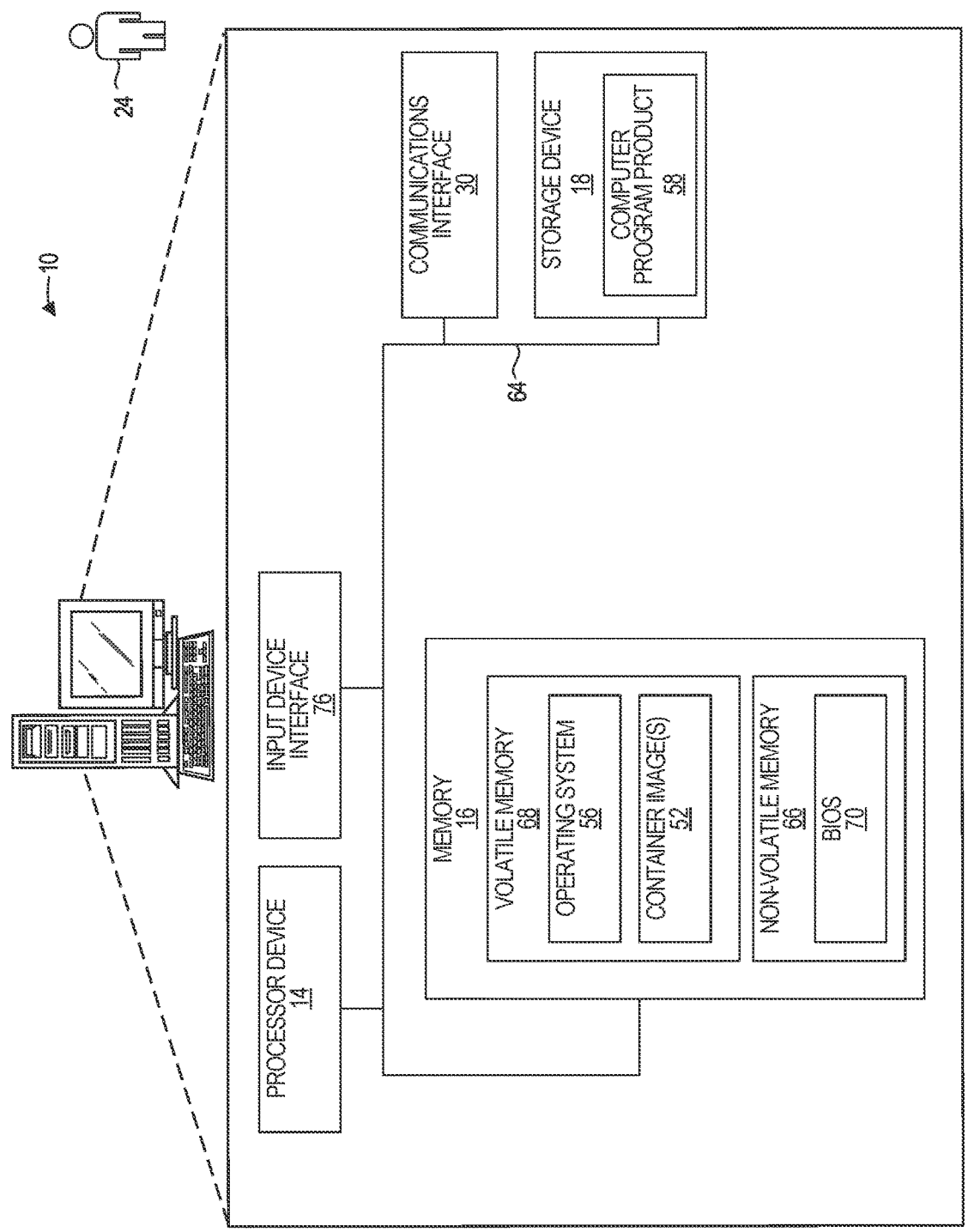
FIG. 5 is a block diagram of a computing device suitable for implementing examples disclosed herein.

FIG. 5 is a block diagram of the source computing device 10 suitable for implementing examples according to one example. The source computing device 10 may comprise any computing or electronic device capable of including firmware, hardware, and/or executing software instructions to implement the functionality described herein, such as a computer server, a desktop computing device, a laptop computing device, a smartphone, a computing tablet, or the like. The source computing device 10 includes the processor device 14, the system memory 16, and a system bus 64. The system bus 64 provides an interface for system components including, but not limited to, the system memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the source computing device 10. The volatile memory 68 may also include a high-speed RAM, such as static RAM, for caching data.

The source computing device 10 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. A number of modules can be stored in the storage device 18 and in the volatile memory 68, including an operating system 56 and one or more program modules, such as the container image(s) 52, which may implement the functionality described herein in whole or in part. All or a portion of the examples may be implemented as a computer program product 58 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14 may serve as a controller, or control system, for the source computing device 10 that is to implement the functionality described herein.

An operator, such as the user 24, may also be able to enter one or more configuration commands through a keyboard (not illustrated), a pointing device such as a mouse (not illustrated), or a touch-sensitive surface such as a display device. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The source computing device 10 may also include the communications interface 20 suitable for communicating with a network as appropriate or desired. The source computing device 10 may also include a video port configured to interface with a display device to provide information to the user 24.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computer system comprising one or more computing devices, data descriptive of a container image, the container image comprising at least one container layer, the at least one container layer having a layer identifier comprising a plurality of characters;
   encoding, by the computer system, a first portion of the layer identifier to produce an encoded identifier, wherein the first portion of the layer identifier comprises a plurality of first characters of the plurality of characters, and wherein a second portion of the layer identifier comprises a remainder of the layer identifier comprising at least one second character of the plurality of characters;
   transmitting, by the computer system, the encoded identifier to a vulnerability registry server;
   receiving, by the computer system, one or more vulnerability identifiers from the vulnerability registry server, each of the one or more vulnerability identifiers associated with the first portion of the layer identifier and respectively comprising second portions; and
   determining, by the computer system, that the layer identifier matches a matching vulnerability identifier of the one or more vulnerability identifiers based on a comparison between a second portion of the layer identifier and a corresponding second portion of the matching vulnerability identifier.

2. The method of claim 1, wherein the method further comprises, in response to determining that the layer identifier matches the matching vulnerability identifier, handling a vulnerability in the container image.

3. The method of claim 1, wherein encoding the first portion of the layer identifier comprises truncating the second portion of the layer identifier from the layer identifier to produce the encoded identifier.

4. The method of claim 1, wherein encoding the first portion of the layer identifier comprises hashing the layer identifier with a hashing algorithm configured to receive the layer identifier as input and produce as output the encoded identifier, wherein the encoded identifier comprises a hashed identifier.

5. The method of claim 4, wherein the hashing algorithm comprises at least one of a Message-Digest 5 (MD5) algorithm, a Secure Hash Algorithm 1 (SHA-1) algorithm, a Secure Hash Algorithm 2 (SHA-2) algorithm, a New Technology LAN Manager (NTLM) algorithm, or a Cyclic Redundancy Check 32 (CRC32) algorithm.

6. The method of claim 1, wherein the plurality of first characters of the first portion of the layer identifier comprises a first set of consecutive characters of the layer identifier, and wherein the at least one second character of the second portion of the layer identifier comprises a second set of consecutive characters of the layer identifier.

7. The method of claim 1, wherein receiving the data descriptive of the container image comprises receiving, by the computer system, a command to download the container image, and wherein the method further comprises, in response to determining that the layer identifier matches the matching vulnerability identifier, aborting a download process of the container image.

8. The method of claim 1, wherein the method further comprises:
   determining, by the computer system, that the layer identifier does not match any of the one or more vulnerability identifiers; and
   in response to determining that the layer identifier does not match any of the one or more vulnerability identifiers, transmitting a communication to one or more remote computing devices indicating that the container image does not match any of the one or more vulnerability identifiers.

9. The method of claim 1, wherein the vulnerability registry server comprises a Common Vulnerabilities and Exposures (CVE) database.

10. A computer system comprising:
    one or more computing devices to:
    receive data descriptive of a container image, the container image comprising at least one container layer, the at least one container layer having a layer identifier comprising a plurality of characters;
    encode a first portion of the layer identifier to produce an encoded identifier, wherein the first portion of the layer identifier comprises a plurality of first characters of the plurality of characters, and wherein a second portion of the layer identifier comprises a remainder of the layer identifier comprising at least one second character of the plurality of characters;
    transmit the encoded identifier to a vulnerability registry server;
    receive one or more vulnerability identifiers from the vulnerability registry server, each of the one or more vulnerability identifiers associated with the first portion of the layer identifier and respectively comprising second portions; and
    determine that the layer identifier matches a matching vulnerability identifier of the one or more vulnerability identifiers based on a comparison between a second portion of the layer identifier and a corresponding second portion of the matching vulnerability identifier.

11. The computer system of claim 10, wherein the one or more computing devices are further to, in response to determining that the layer identifier matches the matching vulnerability identifier, identify a vulnerability in the container image.

12. The computer system of claim 10, wherein, to encode the first portion of the layer identifier, the one or more computing devices are further to truncate the second portion of the layer identifier from the layer identifier to produce the encoded identifier.

13. The computer system of claim 10, wherein, to encode the first portion of the layer identifier, the one or more computing devices are further to hash the layer identifier with a hashing algorithm configured to receive the layer identifier as input and produce as output the encoded identifier, wherein the encoded identifier comprises a hashed identifier.

14. The computer system of claim 13, wherein the hashing algorithm comprises at least one of a Message-Digest 5 (MD5) algorithm, a Secure Hash Algorithm 1 (SHA-1) algorithm, a Secure Hash Algorithm 2 (SHA-2) algorithm, a New Technology LAN Manager (NTLM) algorithm, or a Cyclic Redundancy Check 32 (CRC32) algorithm.

15. The computer system of claim 10, wherein, to receive the data descriptive of the container image, the one or more computing devices are further to receive, by the computer system, a command to download the container image, and wherein the one or more computing devices are further to, in response to determining that the layer identifier matches the matching vulnerability identifier, abort a download process of the container image.

16. The computer system of claim 10, wherein the one or more computing devices are further to:
   determine that the layer identifier does not match any of the one or more vulnerability identifiers; and
   in response to determining that the layer identifier does not match any of the one or more vulnerability identifiers, transmit a communication to one or more remote computing devices indicating that the container image does not match any of the one or more vulnerability identifiers.

17. A non-transitory computer-readable storage medium that includes executable instructions to cause one or more processor devices to:
   receive data descriptive of a container image, the container image comprising at least one container layer, the at least one container layer having a layer identifier comprising a plurality of characters;
   encode a first portion of the layer identifier to produce an encoded identifier, wherein the first portion of the layer identifier comprises a plurality of first characters of the plurality of characters, and wherein a second portion of the layer identifier comprises a remainder of the layer identifier comprising at least one second character of the plurality of characters;
   transmit the encoded identifier to a vulnerability registry server;
   receive one or more vulnerability identifiers from the vulnerability registry server, each of the one or more vulnerability identifiers associated with the first portion of the layer identifier and respectively comprising second portions; and
   determine that the layer identifier matches a matching vulnerability identifier of the one or more vulnerability identifiers based on a comparison between a second portion of the layer identifier and a corresponding second portion of the matching vulnerability identifier.

18. The medium of claim 17, wherein the instructions further cause the one or more processor devices to, in response to determining that the layer identifier matches the matching vulnerability identifier, identify a vulnerability in the container image.

19. The medium of claim 17, wherein to encode the first portion of the layer identifier, the instructions further cause the one or more processor devices to truncate the second portion of the layer identifier from the layer identifier to produce the encoded identifier.

20. The medium of claim 17, wherein, to encode the first portion of the layer identifier, the instructions further cause the one or more processor devices to hash the layer identifier with a hashing algorithm configured to receive the layer identifier as input and produce as output the encoded identifier, wherein the encoded identifier comprises a hashed identifier.

* * * * *